W. S. COFFMAN.
Broadcast-Seeder.
No. 58,219. Patented Sept. 25, 1866.
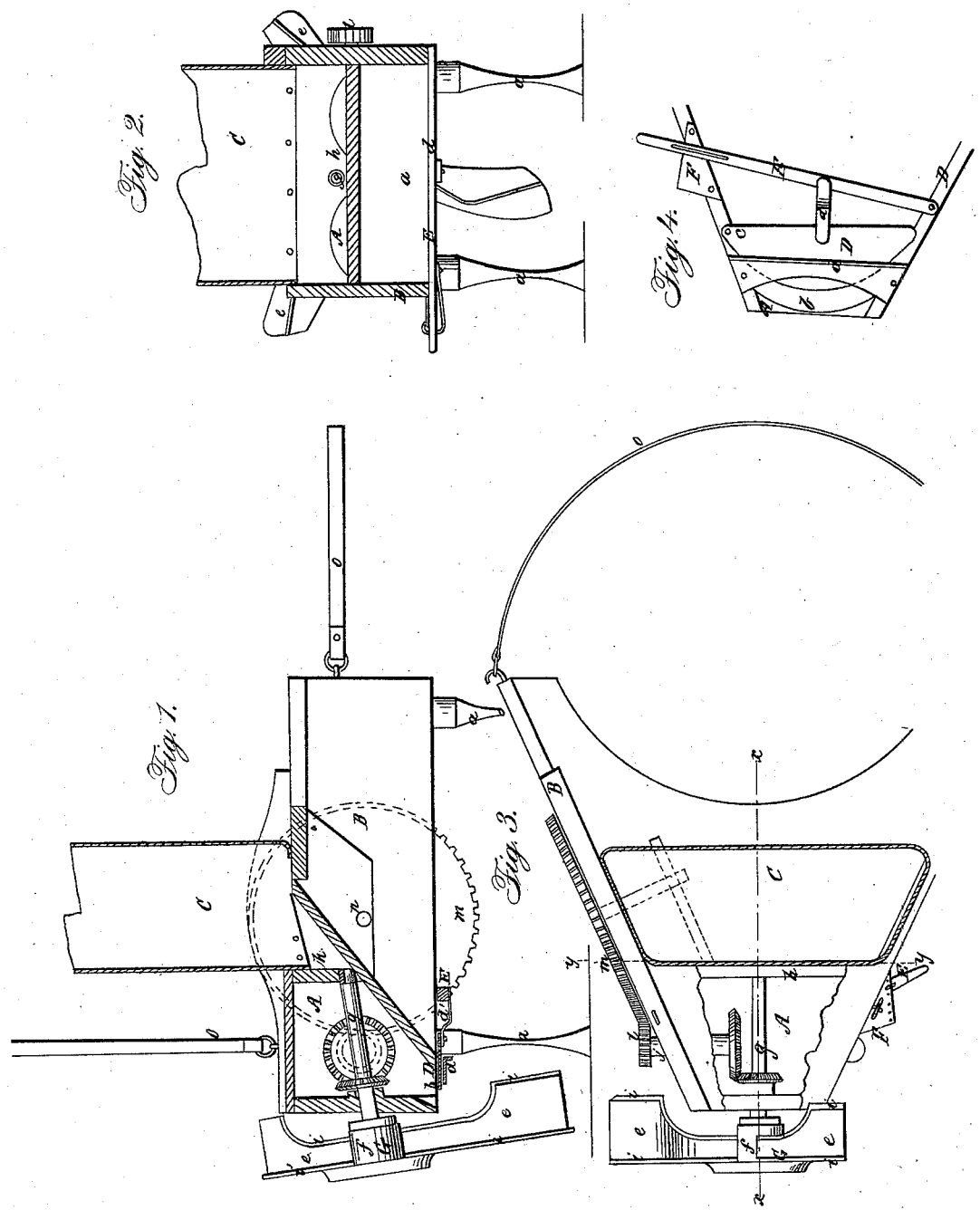
Witnesses:
Inventor:

UNITED STATES PATENT OFFICE.

W. S. COFFMAN, OF COLDWATER, MICHIGAN.

IMPROVEMENT IN BROADCAST-SEEDING MACHINES.

Specification forming part of Letters Patent No. 58,219, dated September 25, 1866.

*To all whom it may concern:*

Be it known that I, W. S. COFFMAN, of Coldwater, in the county of Branch and State of Michigan, have invented a new and Improved Broadcast-Seeding Machine; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 3; Fig. 2, a transverse vertical section of the same, taken in the line $y\,y$, Fig. 3; Fig. 3, a plan or top view of the same, partly in section; Fig. 4, an inverted plan or bottom view of a portion of the same.

Similar letters of reference indicate corresponding parts.

This invention relates to a new and improved broadcast-seeding machine of that class which are designed to be carried by the operator, and worked by him while being carried.

A represents a box, which is connected with a suitable frame, B, provided with four legs, $a$; and C is a bag, the lower end of which is secured to the top of the box A. The box A is provided with an inclined bottom, $a$, shown clearly in Fig. 1, said bottom being inclined downward from its rear to its front end, the front end of the bottom being near the front end of the box, and the latter having an opening, $b$, in it directly in front of the bottom, $d$.

D is a valve, composed of a sheet-metal plate, one end of which is attached by a pivot, $c$, to one side of the box A. This valve extends entirely across the opening $b$, and is retained in position, (snugly against the under side of the box,) by a plate, $d$, attached transversely to the under side of the box. (See Figs. 1 and 4.)

This valve D is connected by a link, $d'$, with a lever, E, one end of which is pivoted to the bottom of the frame B, at one side thereof, the opposite end working over a graduated plate, F, attached to the other side of the frame B. (See Fig. 4.) By this arrangement, the valve D may be opened, so as to graduate the flow of the seed from box A, as may be desired, with the greatest nicety.

G represents a revolving scatterer, composed of a series of wings, $e$, attached radially to a hub, $f$, at the front end of a shaft, $g$, which passes through the front end of the box A, slightly inclined from a horizontal position, the rear bearing $h$ of said shaft being within the box A, as shown in Fig. 1.

The wings $e$ are constructed of flat strips of metal, having lips or flanges $i$ at their sides, and the outer parts of said wings work below the opening $b$ in the under side of box A, so as to catch the seed as it drops therefrom.

The shaft $g$ is rotated from a shaft, $j$, by means of bevel-gears $k$, and the shaft $j$ passes laterally into box A, and has a pinion, $l$, on its outer end into which a spur-wheel, $m$, gears, the latter being on a shaft, $n$, which has its bearings in the frame B. The frame B is suspended to the operator by means of proper straps $o$, passing around the waist and neck, and the bag C being supplied with seed, the operator, as he walks along over the prepared ground, turns the wheel $m$ by means of a crank, and adjusts the valve D to regulate the flow of seed, according to the quantity to be sowed over a given area. The distribution or scattering of the seed is effected by the revolving wings $e$.

It will be seen that belts are entirely avoided, gearing being used instead, and that the distribution of the seed may be regulated as desired with great nicety, and that by means of the legs $a$ the scatterer is protected when the machine is set upon the ground or any place of support.

Having thus described my invention, I claim as new and desire to secure by Letters Patent—

1. The operating of the revolving scatterer by means of gearing, arranged in the manner substantially as shown and described.

2. The inclined bottom $a$, in combination with the valve D, adjusted through the medium of the lever and gage, substantially as and for the purpose specified.

3. The plate $d$, to retain or hold the valve D in place, substantially as and for the purpose set forth.

4. The combination of the box A, with the frame B, provided with legs $a$, substantially as and for the purpose specified.

W. S. COFFMAN.

Witnesses:
G. H. TURNER,
H. B. TURNER.